(12) United States Patent
Smithson et al.

(10) Patent No.: US 10,752,330 B2
(45) Date of Patent: Aug. 25, 2020

(54) HINGE FOR SALOON-TYPE LAVATORY DOOR

(71) Applicant: SAFRAN CABIN INC., Huntington Beach, CA (US)

(72) Inventors: Tyler Smithson, Huntington Beach, CA (US); Songlin Wu, Provo, UT (US); Jordan Ellsworth, Orem, UT (US); Derrek Lewis, Orem, UT (US); Andrew Wade, Provo, UT (US); Darmo Tandjung, Rowland Heights, CA (US)

(73) Assignee: SAFRAN CABIN INC., Huntington Beach, CA (US)

( * ) Notice: Subject to any disclaimer, the term of this patent is extended or adjusted under 35 U.S.C. 154(b) by 0 days.

(21) Appl. No.: 16/358,007

(22) Filed: Mar. 19, 2019

(65) Prior Publication Data
US 2019/0292825 A1    Sep. 26, 2019

Related U.S. Application Data

(60) Provisional application No. 62/646,832, filed on Mar. 22, 2018.

(51) Int. Cl.
*E05D 1/00* (2006.01)
*B64C 1/14* (2006.01)
(Continued)

(52) U.S. Cl.
CPC .......... *B64C 1/1423* (2013.01); *B64C 1/1461* (2013.01); *B64D 11/02* (2013.01);
(Continued)

(58) Field of Classification Search
CPC ......... B64C 1/1423; E05B 65/06; E05D 1/00; E05D 1/02; E05D 1/04; E05D 7/009;
(Continued)

(56) References Cited

U.S. PATENT DOCUMENTS 3,501,800 A * 3/1970 O'Dea .................. F16C 11/04
16/227
3,695,330 A * 10/1972 Hasbrouck ............... E05D 1/02
160/135
(Continued)

FOREIGN PATENT DOCUMENTS

EP          0612904 A2 *  8/1994  ............... E05D 1/00
GB          2189290 A  * 10/1987  ........... E04B 2/7429
(Continued)

OTHER PUBLICATIONS

Partial European Search Report issued in European Appln. 19164752.9-1005.

*Primary Examiner* — Chuck Y Mah
(74) *Attorney, Agent, or Firm* — Jeffer Mangels; Butler & Mitchell LLP; Brennan C. Swain, Esq.

(57) ABSTRACT

A hinge assembly that includes a frame adapter having a curved inner surface with a front portion and a rear portion, a door adapter having a curved outer surface with a front portion and a rear portion, at least one front hinge strip that is secured along a front hinge strip path, and at least one rear hinge strip that is secured along a rear hinge strip path. The front hinge strip path extends from the front portion of the curved outer surface of the door adapter to the rear portion of the curved inner surface of the frame adapter. The rear hinge strip path extends from the rear portion of the curved outer surface of the door adapter to the front portion of the curved inner surface of the frame adapter. The curved outer surface of the door adapter opposes the curved inner surface of the frame adapter and the door adapter is movable relative to the frame adapter between a front open position, a closed position and a rear open position.

17 Claims, 11 Drawing Sheets

(51) Int. Cl.

| | |
|---|---|
| *E05C 19/00* | (2006.01) |
| *E05D 1/04* | (2006.01) |
| *E05D 7/00* | (2006.01) |
| *E06B 3/36* | (2006.01) |
| *B64D 11/02* | (2006.01) |
| *E05F 1/00* | (2006.01) |
| *E05B 47/00* | (2006.01) |
| *E06B 3/32* | (2006.01) |
| *E05B 65/06* | (2006.01) |
| *E05D 7/081* | (2006.01) |

(52) U.S. Cl.
CPC .......... *E05B 47/0046* (2013.01); *E05B 65/06* (2013.01); *E05C 19/001* (2013.01); *E05D 1/04* (2013.01); *E05D 7/009* (2013.01); *E05D 7/081* (2013.01); *E05F 1/00* (2013.01); *E06B 3/325* (2013.01); *E06B 3/362* (2013.01); *E05Y 2900/114* (2013.01); *E05Y 2900/502* (2013.01); *E05Y 2900/531* (2013.01)

(58) Field of Classification Search
CPC .......... E06B 3/325; E06B 3/362; F16C 11/12; Y10T 403/54
See application file for complete search history.

(56) References Cited

U.S. PATENT DOCUMENTS

| | | | | |
|---|---|---|---|---|
| 4,558,911 | A * | 12/1985 | Ruoff ................ | B25J 9/104 338/79 |
| 4,619,304 | A * | 10/1986 | Smith ................ | G09F 15/0068 160/135 |
| 4,843,679 | A * | 7/1989 | Maidment ............ | E04B 2/7429 16/227 |
| 5,048,585 | A * | 9/1991 | Miller ................ | A47G 5/00 16/227 |
| 5,367,744 | A * | 11/1994 | Ahlberg ............. | E04B 2/7429 16/227 |
| 5,732,757 | A * | 3/1998 | Mariol ............... | A47B 47/0033 16/225 |
| 7,328,481 | B2 * | 2/2008 | Barnett ............... | E05D 3/08 16/227 |
| 2014/0224930 | A1 | 8/2014 | Ivester | |
| 2017/0175223 | A1 | 6/2017 | Guezennec et al. | |

FOREIGN PATENT DOCUMENTS

| | | | |
|---|---|---|---|
| GB | 2254881 A | 10/1992 | |
| JP | 2001262747 A * | 9/2001 | ............. E05D 3/122 |
| WO | WO-9902807 A1 * | 1/1999 | ............... E05D 1/00 |

* cited by examiner

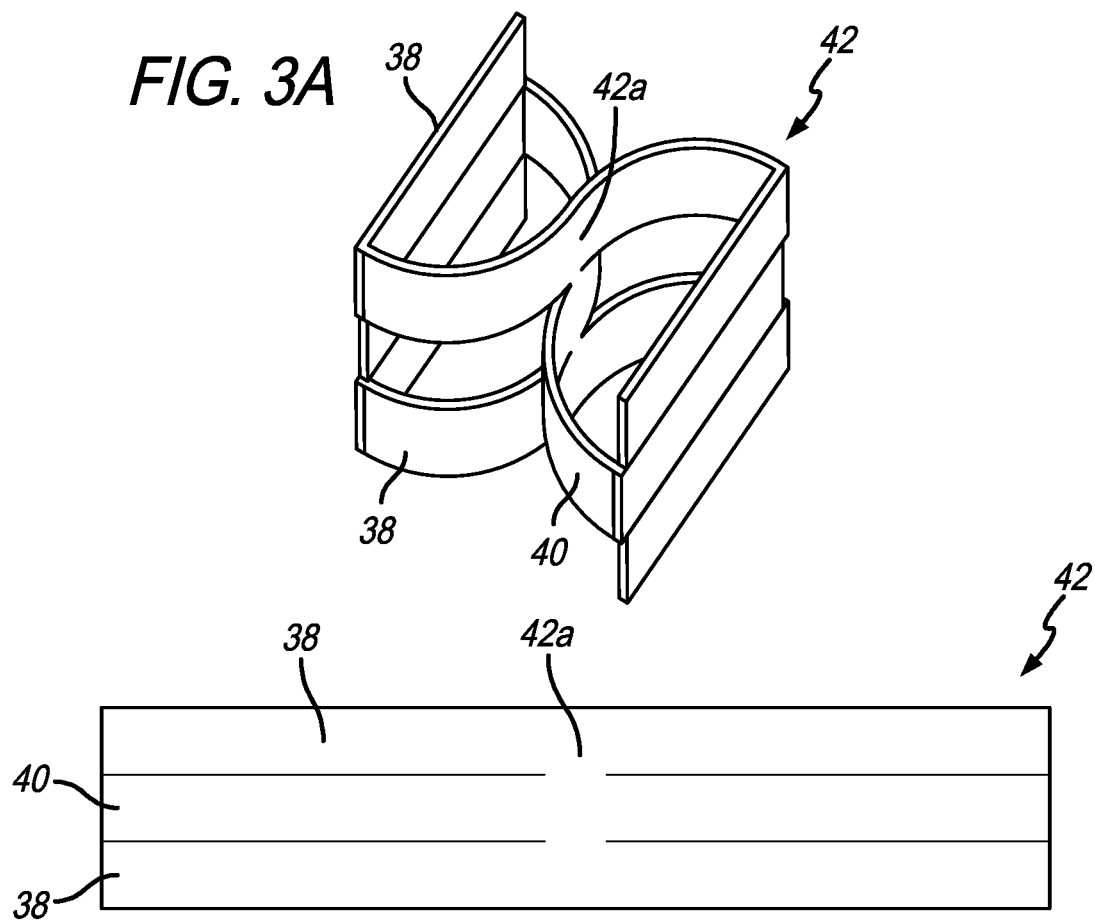
FIG. 3A
FIG. 3B
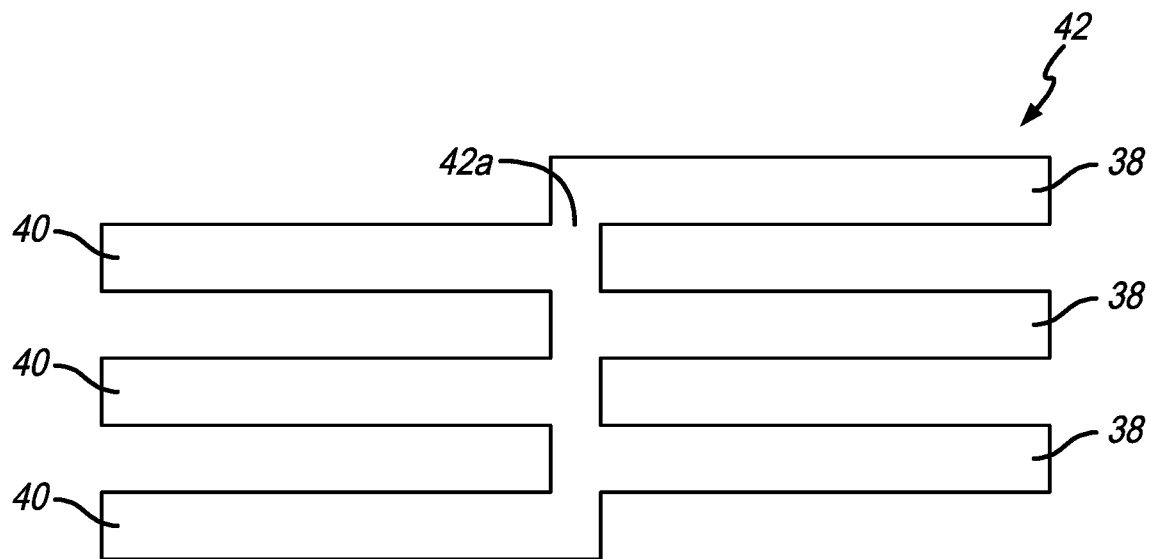
FIG. 3C

HINGE FOR SALOON-TYPE LAVATORY DOOR

CROSS REFERENCE TO RELATED APPLICATIONS

This application claims the benefit of U.S. Provisional Application No. 62/646,832, filed Mar. 22, 2018, the entirety of which is incorporated herein by reference.

FIELD OF THE INVENTION

The present invention relates generally to a lavatory door, and more particularly to a saloon-type lavatory door for an aircraft.

BACKGROUND OF THE INVENTION

Airplane lavatories are known to be uncomfortable and unpleasant experiences for many users. One of the contributing factors to user experience in an airplane lavatory is the lavatory door. Accordingly, a need exists for an improved lavatory door.

SUMMARY OF THE PREFERRED EMBODIMENTS

In accordance with a first aspect of the present invention there is provided a saloon-type door assembly that includes a right door assembly and a left door assembly. The right door assembly includes a right frame adapter that includes a curved inner surface that defines a first apex, a front portion and a rear portion, a right door adapter that includes a curved outer surface that defines a second apex, a front portion and a rear portion and a right door panel that is associated with the right door adapter. The curved outer surface of the right door adapter opposes the curved inner surface of the right frame adapter. The right door assembly also includes at least one right front hinge strip that is secured along at least a portion of a front hinge strip path and at least one right rear hinge strip that is secured along at least a portion of a rear hinge strip path. The front hinge strip path extends from the front portion of the curved outer surface of the right door adapter to the rear portion of the curved inner surface of the right frame adapter. The rear hinge strip path extends from the rear portion of the curved outer surface of the right door adapter to the front portion of the curved inner surface of the right frame adapter. The left door assembly includes a left frame adapter that includes a curved inner surface that defines a first apex, a front portion and a rear portion, a left door adapter that includes a curved outer surface that defines a second apex, a front portion and a rear portion and a left door panel that is associated with the left door adapter. The curved outer surface of the left door adapter opposes the curved inner surface of the left frame adapter. The left door assembly also includes at least one left front hinge strip that is secured along at least a portion of a front hinge strip path and at least one left rear hinge strip that is secured along at least a portion of a rear hinge strip path. The front hinge strip path extends from the front portion of the curved outer surface of the left door adapter to the rear portion of the curved inner surface of the left frame adapter. The rear hinge strip path extends from the rear portion of the curved outer surface of the left door adapter to the front portion of the curved inner surface of the left frame adapter. the right and left door panels are both movable between a front open position, a closed position and a rear open position. The inner surface of the left door panel opposes the inner surface of the right door panel when they are each in the closed position.

In a preferred embodiment, the right door assembly includes a plurality of alternating right front hinge strips and right rear hinge strips and the left door assembly includes a plurality of alternating left front hinge strips and left rear hinge strips. Preferably, the plurality of alternating right front hinge strips and right rear hinge strips are attached to form a right hinge band and the plurality of alternating left front hinge strips and left rear hinge strips are attached to form a left hinge band. In a preferred embodiment, the right front hinge strip and the right rear hinge strip bias the right door panel to the closed position and the left front hinge strip and the left rear hinge strip bias the left door panel to the closed position. In a preferred embodiment, the right door panel and the right door adapter are unitary or monolithically formed and wherein the left door panel and the left door adapter are unitary or monolithically formed.

In a preferred embodiment, the right door adapter includes a flat surface, the front hinge strip path extends from the flat surface to the front portion of the curved outer surface of the right door adapter to the rear portion of the curved inner surface, and the rear hinge strip path extends from the flat surface to the rear portion of the curved outer surface of the right door adapter to the front portion of the curved inner surface of the right frame adapter. In a preferred embodiment, the left door adapter includes a flat surface, the front hinge strip path extends from the flat surface to the front portion of the curved outer surface of the left door adapter to the rear portion of the curved inner surface of the left frame adapter and the rear hinge strip path extends from the flat surface to the rear portion of the curved outer surface of the left door adapter to the front portion of the curved inner surface of the left frame adapter. In a preferred embodiment, the right frame adapter includes a flat surface, the front hinge strip path extends from the flat surface of the right door adapter to the front portion of the curved outer surface of the right door adapter to the rear portion of the curved inner surface of the right frame adapter and to the flat surface of the right frame adapter and the rear hinge strip path extends from the flat surface of the right door adapter to the rear portion of the curved outer surface of the right door adapter to the front portion of the curved inner surface of the right frame adapter and to the flat surface. In a preferred embodiment, the left frame adapter includes a flat surface, the front hinge strip path extends from the flat surface of the left door adapter to the front portion of the curved outer surface of the left door adapter to the rear portion of the curved inner surface of the left frame adapter and to the flat surface of the left frame adapter and the rear hinge strip path extends from the flat surface of the left door adapter to the rear portion of the curved outer surface of the left door adapter to the front portion of the curved inner surface of the left frame adapter and to the flat surface of the left frame adapter.

In another preferred embodiment, the right frame adapter includes a flat surface, the front hinge strip path extends from the front portion of the curved outer surface of the right door adapter to the rear portion of the curved inner surface of the right frame adapter and to the flat surface and the rear hinge strip path extends from the rear portion of the curved outer surface of the right door adapter to the front portion of the curved inner surface of the right frame adapter and to the flat surface. In a preferred embodiment, the left frame adapter includes a flat surface, the front hinge strip path extends from the front portion of the curved outer surface of the left door adapter to the rear portion of the curved inner surface of the left frame adapter and to the flat surface and the rear hinge strip path extends from the rear portion of the curved outer surface of the left door adapter to the front portion of the curved inner surface of the left frame adapter and to the flat surface. In a preferred embodiment, the right door adapter includes a flat surface, the front hinge strip path extends from the flat surface of the right door adapter to the front portion of the curved outer surface of the right door adapter to the rear portion of the curved inner surface of the right frame adapter and to the flat surface of the right frame adapter and the rear hinge strip path extends from the flat surface of the right door adapter to the rear portion of the curved outer surface of the right door adapter to the front portion of the curved inner surface of the right frame adapter and to the flat surface of the right frame adapter. In a preferred embodiment, the left door adapter includes a flat surface, the front hinge strip path extends from the flat surface of the left door adapter to the front portion of the curved outer surface of the left door adapter to the rear portion of the curved inner surface of the left frame adapter and to the flat surface of the left frame adapter and the rear hinge strip path extends from the flat surface of the left door adapter to the rear portion of the curved outer surface of the left door adapter to the front portion of the curved inner surface of the left frame adapter and to the flat surface of the left frame adapter.

In a preferred embodiment, the saloon-type door assembly includes a frame that includes an opening defined therein and the left and right door assemblies are positioned in the opening. In a preferred embodiment, the right frame assembly is monolithically formed with the frame and the left frame assembly is monolithically formed with the frame. Preferably, the right door panel includes a magnet member disposed adjacent a top edge thereof and the left door panel includes a magnet member disposed adjacent a top edge thereof. In this embodiment, the frame includes a header that has a magnet member disposed adjacent a bottom edge thereof that opposes the magnet member of the right door panel and a magnet member disposed adjacent a bottom edge thereof that opposes the magnet member of the left door panel.

In a preferred embodiment, the door assembly includes a lock assembly that has a blocking member, at least a first linkage assembly and a first handle. The blocking member, first linkage assembly and handle are associated with one of the left or right door panels and a receiver member defining a pocket is associated with the other of the left or right door panels. Movement of the handle along a curved path from a start position to a finish position moves the blocking member between a first position and a second position where at least a portion of the blocking member is positioned in the pocket. In a preferred embodiment, the first linkage assembly includes a first triangle member assembly and a first bar member. The first triangle member assembly includes first, second and third corners. The first corner is pivotably attached to a first end of the first bar member, and a second end of the first bar member is pivotably attached to the blocking member. The first triangle member assembly includes first, second and third legs. The first leg extends between the first and second corners, the second leg extends between the second and third corners, and the third leg extends between the first and third corners. The first handle is associated with the third corner of the first triangle member assembly. A first distance is defined between the handle and the blocking member when the blocking member is in the first position and a second distance is defined between the handle and the blocking member when the blocking member is in the second position. The second distance is greater than the first distance.

In a preferred embodiment, the lock assembly includes a detent assembly that includes a cap that is biased against the first triangle member assembly. When the handle is in the start position the cap presses against the second leg of the first triangle member assembly and when the handle is in the finish position the cap presses against the first leg of the first triangle member assembly.

In accordance with another aspect of the present invention there is provided a hinge assembly that includes a frame adapter having a curved inner surface that defines a first apex, a front portion and a rear portion, a door adapter that includes a curved outer surface that defines a second apex, a front portion and a rear portion. The curved outer surface of the door adapter opposes the curved inner surface of the frame adapter. The hinge assembly also includes at least one front hinge strip that is secured along at least a portion of at least a portion of a front hinge strip path and at least one rear hinge strip that is secured along at least a portion of a rear hinge strip path. The front hinge strip path extends from the front portion of the curved outer surface of the door adapter to the rear portion of the curved inner surface of the frame adapter and the rear hinge strip path extends from the rear portion of the curved outer surface of the door adapter to the front portion of the curved inner surface of the frame adapter. The door adapter is movable relative to the frame adapter between a front open position, a closed position and a rear open position. In a preferred embodiment, the hinge assembly includes a plurality of alternating front and rear hinge strips. Preferably, the plurality of alternating front hinge strips and rear hinge strips are attached to form a hinge band. The alternating front hinge strips and rear hinge strips can be attached along an apex portion to form the hinge band. In a preferred embodiment, the front hinge strip and the rear hinge strip are made of a material such that they bias the door adapter to the closed position.

In a preferred embodiment, the door adapter and the frame adapter each include a flat surface. In a preferred embodiment, the flat surface of the door adapter is generally parallel to a line tangent to the second apex and the flat surface of the frame adapter is generally parallel to a line tangent to the first apex. Preferably, a door panel is attached to the flat surface of the door adapter. At least a portion of the front and rear hinge strips may be positioned between the door panel and the door adapter.

In accordance with another aspect of the present invention there is provided a lock assembly that includes a blocking member, and a first linkage assembly that includes a first triangle member assembly and a first bar member. The first triangle member assembly includes first, second and third corners. The first corner is pivotably attached to a first end of the first bar member and a second end of the first bar member is pivotably attached to the blocking member. The first triangle member assembly includes first, second and third legs. The first leg extends between the first and second corners, the second leg extends between the second and third corners, and the third leg extends between the first and third corners. The lock assembly also includes a first handle associated with the third corner of the first triangle member assembly. Movement of the handle along a curved path from a start position to a finish position moves the blocking member between a first position and a second position. A first distance is defined between the handle and the blocking member when the blocking member is in the first position and a second distance is defined between the handle and the blocking member when the blocking member is in the second position, wherein the second distance is greater than the first distance.

In a preferred embodiment, the lock assembly includes a vertical bar and a second linkage assembly. The first handle extends outwardly from the vertical bar or the first triangle member assembly. The third corner of the first linkage assembly is pivotably attached to the vertical bar. The second linkage assembly includes a second triangle member assembly and a second bar member. The second triangle member assembly includes first, second and third corners. The first corner is pivotably attached to a first end of the second bar member and the third corner is pivotably attached to the vertical bar. The second end of the second bar member is pivotably attached to the blocking member. The second triangle member assembly includes first, second and third legs The first leg extends between the first and second corners, the second leg extends between the second and third corners and the third leg extends between the first and third corners.

In a preferred embodiment, the lock assembly includes a receiver member that has a pocket defined therein. In the first position the blocking member is not received in the pocket and in the second position the blocking member is received in the pocket. Preferably, the third leg of the first triangle member assembly is longer than the first and second legs and the first and second legs of the first triangle member assembly are the same length. In a preferred embodiment, the lock assembly includes a detent assembly that includes a cap that is biased against the first triangle member assembly. When the handle is in the start position the cap presses against the second leg of the first triangle member assembly and when the handle is in the finish position the cap presses against the first leg of the first triangle member assembly. Preferably, the triangle member assembly includes a detent surface. The cap slides along the detent surface with the handle is moved from the start position to the finish position. In a preferred embodiment, the leading portion or edge of the blocking member defines an elliptical cross-section and the pocket defines an elliptical cross-section for receiving the blocking member.

In a preferred embodiment, the left frame adapter includes a magnet member disposed adjacent the first apex and the left door adapter includes a magnet member disposed adjacent the second apex that opposes the magnet member of the left frame adapter. Preferably, the right frame adapter includes a magnet member disposed adjacent the first apex and the right door adapter includes a magnet member disposed adjacent the second apex that opposes the magnet member of the right frame adapter. The magnets members can be disposed in openings defined in the inner and outer curved surfaces or can be embedded in the frame and door adapters.

In a preferred embodiment, the present invention provides a lavatory door with higher reliability than existing bi-fold lavatory doors while maintaining space efficiency. Preferably, the invention is a saloon-type door. It will be appreciated by those of ordinary skill in the art that a saloon-type door, also known in the art as cafe doors, include two opposing panels that open in the middle thereof and often use bidirectional hinges that close the door regardless of which direction it is opened by incorporating springs or other biasing members.

The door assembly disclosed herein includes a plurality of subsystems, including the hinge and door stop mechanism, the lock and gap seal mechanism, and the door panels. The hinge provides a self-closing door that preferably allows up to and including 180 degree rotation each way. This is important so that the user is not boxed in when exiting the lavatory if the door only opens 90 degrees outward into the aisle. Another important design concern for the lavatory door was to allow egress in case of an emergency. If the door only opens 90 degrees into the aisle when opened, this would block passage through the aisle. A hinge design with 180 degree rotation allows a user to push the panel until it is flat against the wall, allowing easy passage through the aisle in case of emergency. The hinge assembly includes strips of material. Materials for use in the hinge can include synthetic polymer fabrics such as ripstop nylon, ripstop polyester, HDPE (High Density Polyethylene) and Nylon blends, and UHMWPE (Ultra High Molecular Weight Polyethylene) fabric also known as Dyneema. In a preferred embodiment, these synthetic polymer fabrics have the necessary value ranges of strength and toughness to prevent the door panel from sagging while also being able to flex 180 degrees without experiencing plastic deformation or failure. In a preferred embodiment, a DCF Hybrid UHMWPE material (Dyneema mixed with polyester) is used due to its stiffness as well as flexibility.

In a preferred embodiment, in order for the hinge to function properly it requires that each side of the hinge (wall and lavatory door panel) requires a radius that is one half of the door panel width. In a preferred embodiment, in order to self-close the door afterwards, magnets can be included between the door panel and the frame to bring the door back to center after being opened. In another embodiment, the magnets can be omitted. In a preferred embodiment, one or two magnets are placed at the top or bottom of the panel that are strong enough to pull the door back to center. In another embodiment, more than two magnets can be included. To prevent the closing panels from brushing against a user, magnets inserted into the door and wall panels that connect when the door is fully open on the opposite end of the closing magnets giving them a mechanical advantage and allowing the door to stay open when it is fully opened and then to close by itself once a close is initiated by the user are used.

The lock or stop assembly includes a blade member or blocking member that resides inside one of the door panels and runs most or all of the length of the panel. The blade member is connected to a four-bar linkage mechanism. The opposite door panel includes a receiver into which the blocking member is inserted when the door is locked. The blocking member blocks the doors from being opened. The receiver can simply be a pocket cut or carved into the opposite door panel or can be an insert that includes a pocket that is secured in the opposite door panel.

In a preferred embodiment, the assembly also includes a detent assembly that provides a "feel" for the user that that the lock assembly was either locked or unlocked. In other words, the detent provides a tactic indicator that the assembly is fully locked or unlocked. In a preferred embodiment, the detent assembly includes a bi-stable cam and spring mechanism.

The lock assembly also includes triangular brackets that pivotably attach to the long vertical linkage that includes the user handle and bar members or linkages that apply the direct force to the blocking member in order to move it. It will be appreciated that the length of two legs of the triangle can be changed to adjust the mechanical advantage properties of the mechanism and that if the leg attached to the vertical linkage the user moves is longer than the leg attached to the bar member there is a greater mechanical advantage. In a preferred embodiment, the door panels are made of a honeycomb material and are between 0.5" and 0.75" in thickness. Preferably, the handles do not extend outwardly from the door so far as to be in the way, but also do not easily catch on users' clothing or bags.

The blocking member is moved by the four-bar linkage (as a result of movement of the handle along the curved path) and provides the blocking member with a quarter-circle path of motion. This causes the blocking member to move horizontally or outwardly from its initial or first position approximately one inch as well as vertically up one inch. In a preferred embodiment, the four-bar mechanism consists of the blocking member, three rectangular linkages or bar members that connect the blade to one corner of the triangular members and the triangular members. The triangular members or brackets have a fixed point at the second corners, about which they pivot to produce the desired motion. The triangular members are connected at the third corner to each other (via the vertical linkage) to maintain consistent motion. These three bracket assemblies make up the four-bar linkage to ensure that the motion of the blade will be all translation and no rotation (two bracket assemblies can be used). At the fixed corner of the triangular member, a biaxial mechanism is used to force the lock to either be in the locked or the unlocked position, with no stopping in an intermediate position. As the door is locked, the spring is be compressed as the corner of the triangle member presses into the spring. Once handle has been moved past the halfway point of the path and the spring is past the corner of the triangle member or detent block, the spring preferably forces the blocking member the rest of the way.

In a preferred embodiment, the legs of the triangular brackets have a ratio of 1:1 because that ratio provides the desired motion and a reasonable force. Preferably, each of the triangle members includes a detent assembly associated therewith. However, in another embodiment as few as a single detent assembly can be included.

In a preferred embodiment, the profile of the edge of the blocking member is an ellipse to assist with indexing the door panels in the center position and limit the friction forces of the inserting of the blocking member into the receiver. In a preferred embodiment, the components of the lock assembly mainly comprise HDPE to provide the lock with stiffness, low weight and low friction forces. However, other plastics, metals and other materials can be used for any of the components.

The handle is preferably made of aluminum, but can be other metal or plastic and is designed to help prevent users' clothing or bags from catching on the handle if they decide to push the door in. Preferably, the door assembly includes four handles: two on the inside and two on the outside. This provides the option for the user to push or pull on the doors when entering or exiting. The handle is fairly small and allows for pulling with at least two fingers and at most four fingers.

BRIEF DESCRIPTION OF THE DRAWINGS

The invention may be more readily understood by referring to the accompanying drawings in which:

FIG. 3A is a detailed view of a portion of the hinge band;

FIG. 3B shows the hinge band from FIG. 3A stretched out;

FIG. 3C shows an alternate hinge band in a stretched out position;

Like numerals refer to like parts throughout the several views of the drawings.

DETAILED DESCRIPTION OF THE PREFERRED EMBODIMENTS

Figure 1:
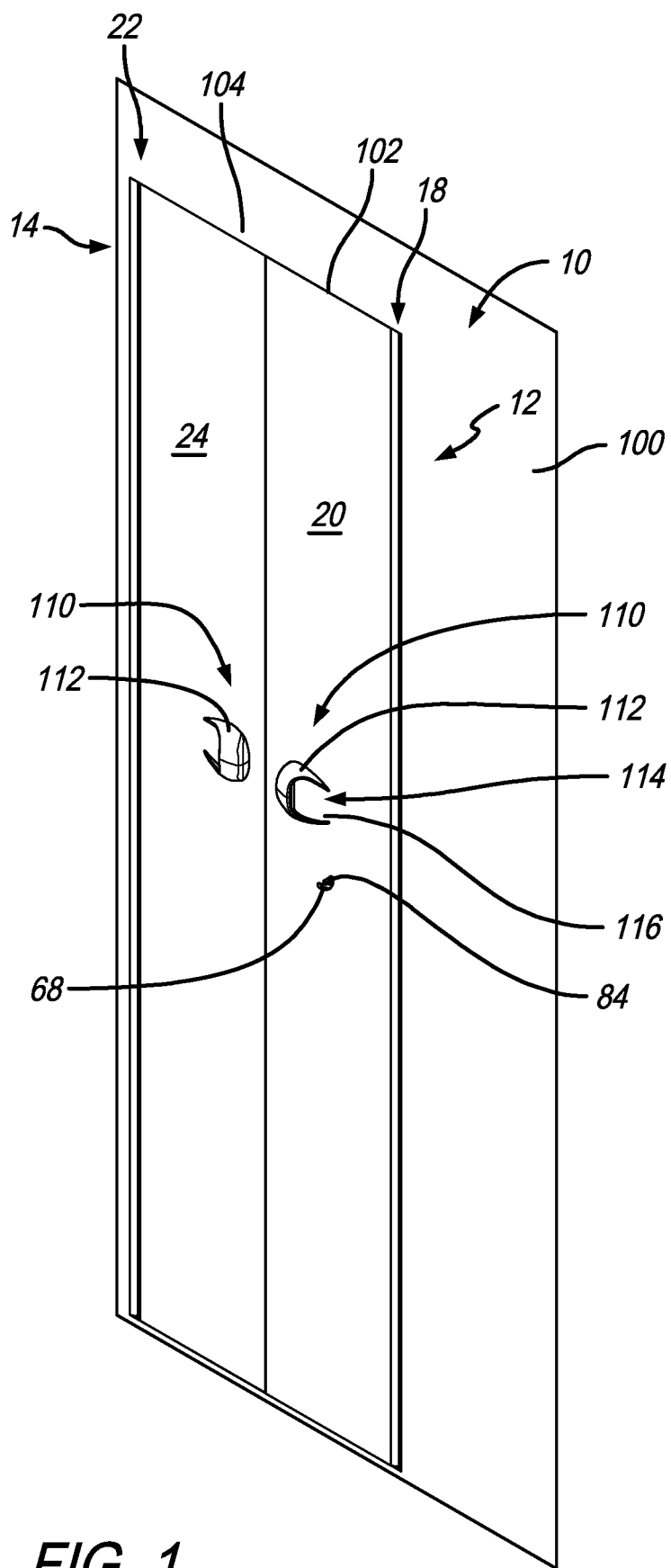
FIG. 1 is a perspective view of a wall that includes a saloon-type door assembly positioned therein in accordance with a preferred embodiment of the present invention.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the-disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Referring now to the drawings, wherein the showings are for purposes of illustrating the present invention and not for purposes of limiting the same, FIGS. 1-13 show a saloon-type door assembly that includes a hinge assembly and lock assembly. In an exemplary embodiment, the door assembly can be used in aircraft lavatories. However, this is not a limitation on the present invention and the assembly can be used in other places where a door is desired.

Figure 2:
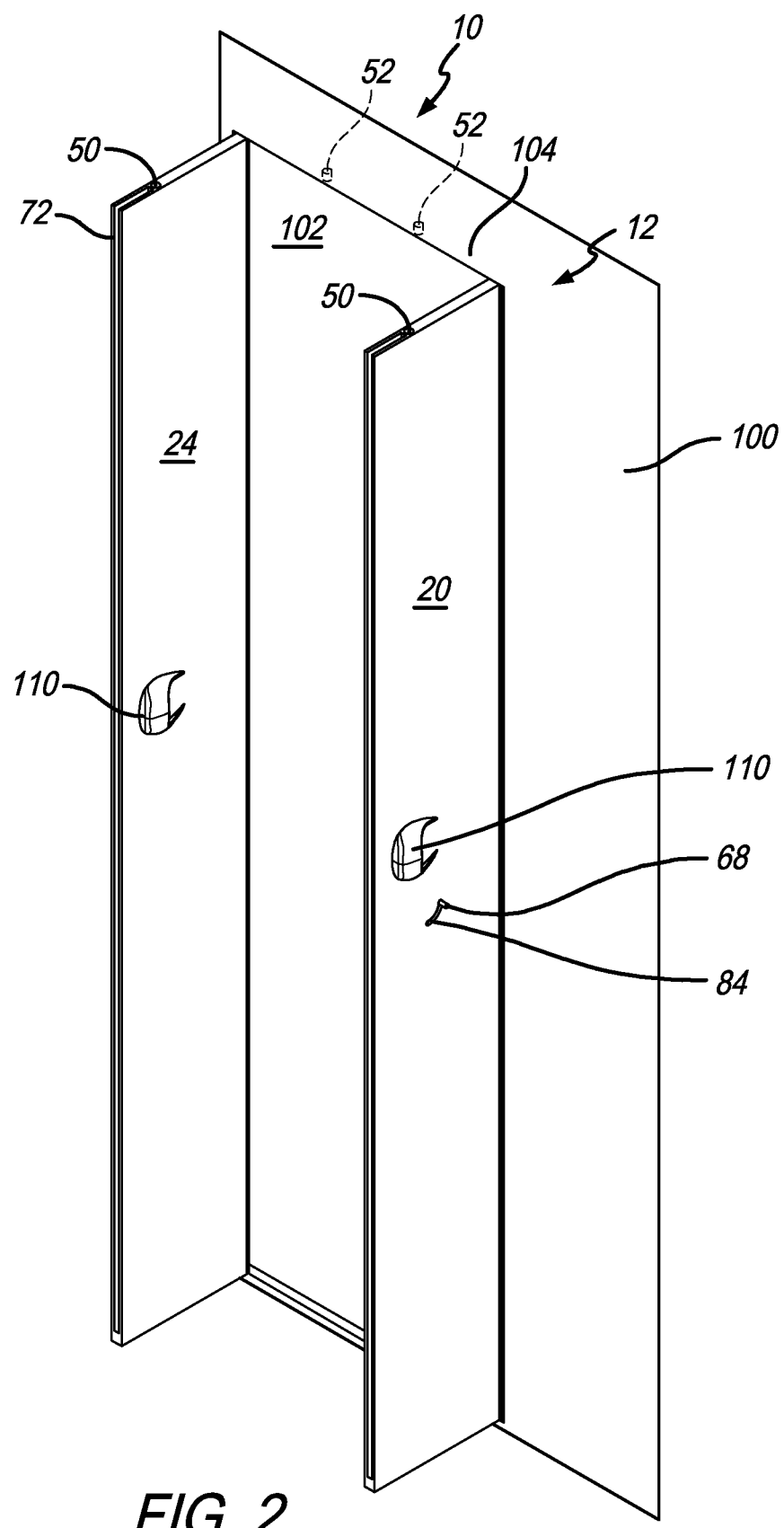
FIG. 2 is a perspective view of the saloon-type door assembly of FIG. 1 with the door panels in the open position.
Figure 3:
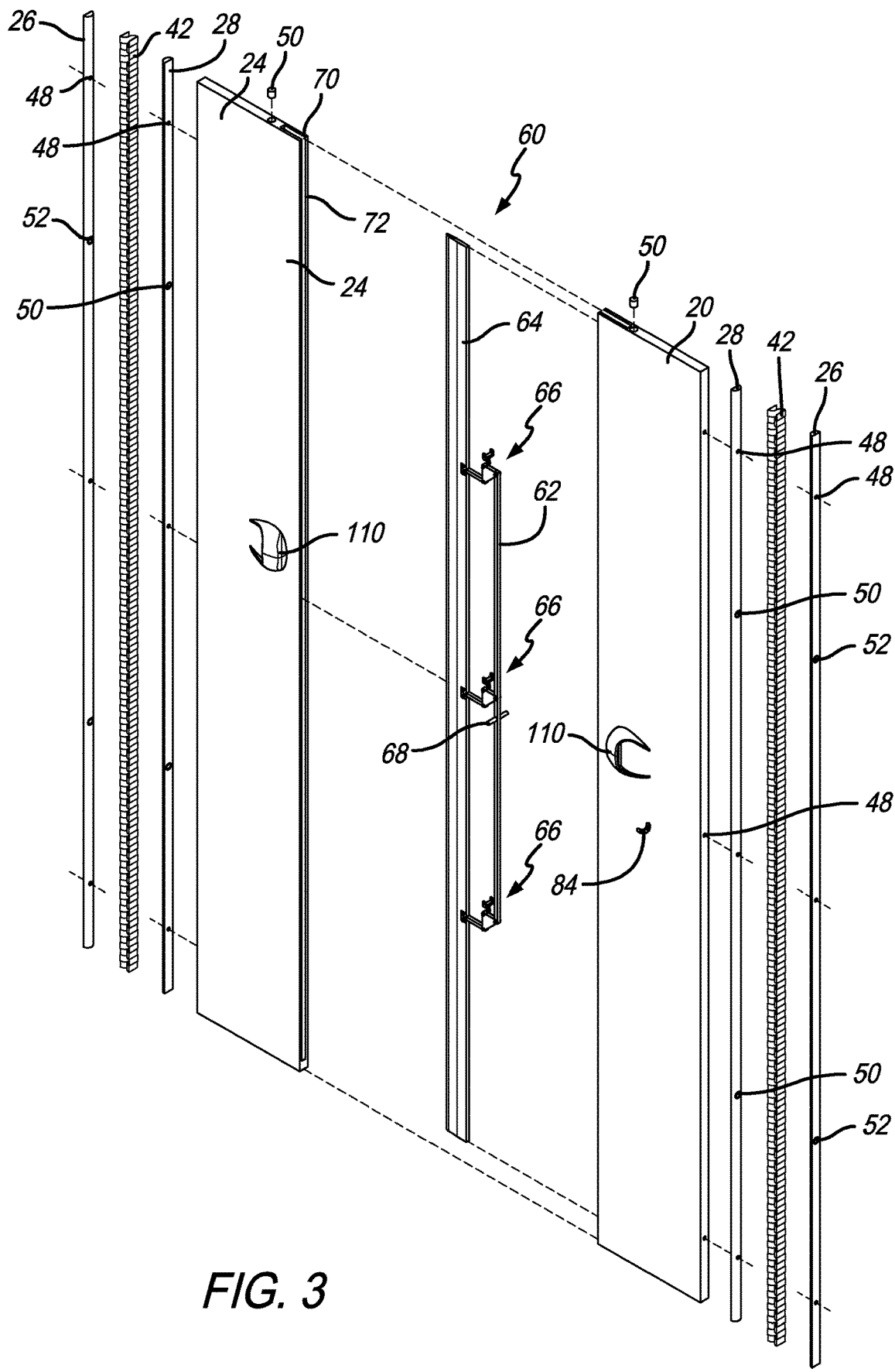
FIG. 3 is an exploded perspective view of the saloon-type door assembly of FIG. 1.

As shown in FIGS. 1-3, the saloon-type door assembly 10 generally includes a right door assembly 12, a left door assembly 14, and a lock assembly 60. The saloon-type door assembly 10 is positioned in a wall or door frame 100 that defines a door opening 102. The frame 100 includes a header 104. Each of the right door assembly 12 and left door assembly 14 are movable between a closed position (see FIG. 1) and a front open position (see FIG. 2) and a rear open position. FIG. 2 shows the right and left door assemblies open to about 90° in the front open position. However, it will be appreciated that the right and left door assemblies can open anywhere between 90° and 180°. In a preferred embodiment, the right door assembly 12 includes a right hinge assembly 18 and a right door panel 20 and the left door assembly 14 includes a left hinge assembly 22 and a left door panel 24.

Figure 4A:
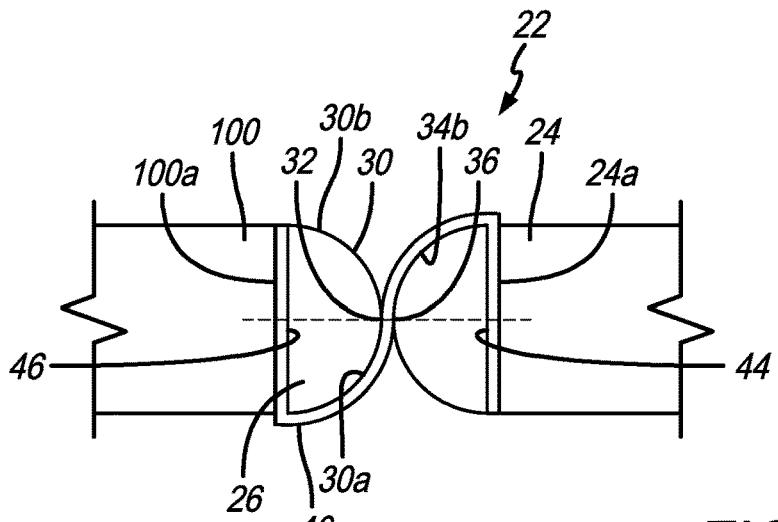
FIG. 4A is a top plan view of an embodiment of a hinge assembly.

FIGS. 4A-6B show different embodiments of the hinge assemblies. For ease of description only the left hinge assembly 22 is shown and described. It will be appreciated that the description also applies to the right hinge assembly 18 and associated components. As shown in FIGS. 4A-4B, the left hinge assembly 22 includes a left frame adapter 26 and a left door adapter 28. The left frame adapter 26 includes a curved inner surface 30 that defines a first apex 32. The curved inner surface 30 includes a front portion 30a and a rear portion 30b. The left door adapter 28 includes a curved outer surface 34 that defines a second apex 36. The curved outer surface 34 includes a front portion 34a and a rear portion 34b. As shown in FIG. 4A, the curved inner surface 30 opposes the curved outer surface 34. It will be appreciated that the front and rear portions of the curved inner and outer surfaces are defined by or divided by the first and second apexes 32 and 36 (see the dashed line in FIG. 4A).

Figure 4B:
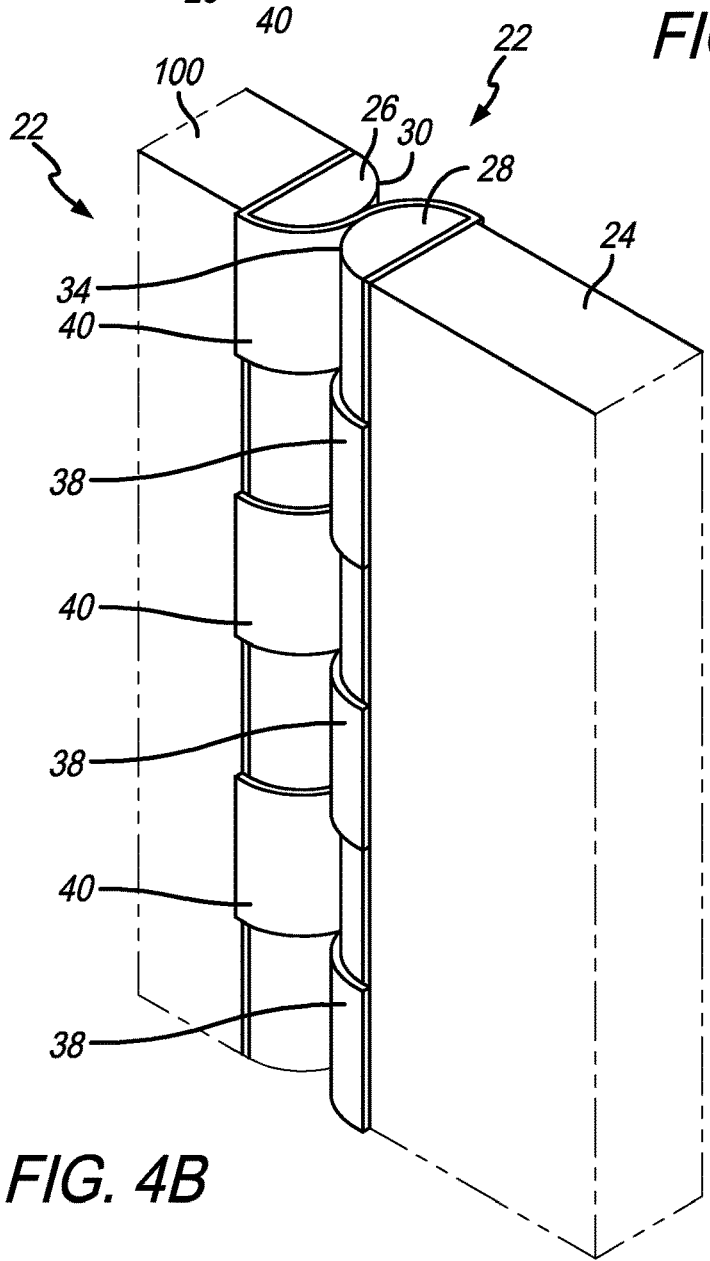
FIG. 4B is a perspective view of the hinge assembly shown in FIG. 4A.

As shown in FIGS. 4A-4B, the hinge assembly includes front and rear hinge strips. Preferably, the left hinge assembly 22 (and left door assembly 14) includes at least one front hinge strip 38 that is secured along at least a portion of a front hinge strip path and at least one rear hinge strip 40 that is secured along at least a portion of a rear hinge strip path. The front hinge strip path extends from the front portion 34a of the curved outer surface 34 of the left door adapter 28 to the rear portion 30b of the curved inner surface 30 of the left frame adapter 26. The rear hinge strip path extends from the rear portion 34b of the curved outer surface 34 of the left door adapter 28 to the front portion 30a of the curved inner surface 30 of the left frame adapter 26. In a preferred embodiment, the left hinge assembly 22 includes a plurality of alternating front and rear hinge strips 38 and 40 that extend vertically thereon. The hinge strips can be separate pieces or they can form a hinge band 42 (where they are all connected together), as shown in FIGS. 3-3B. In a preferred embodiment, the alternating front and rear hinge strips are connected along the portions that cover the apexes of the curved inner and outer surfaces to form the hinge band 42. In this embodiment, the connected portion of the hinge band 42 is referred to herein as the apex portion 42a. FIG. 3A shows the hinge band 42 with a connected apex portion 42a. FIG. 3B shows the hinge band 42 in a stretched or laid out position. In other words, it shows the front and rear hinge strips prior to being wrapped around the frame and door adapters. FIG. 3C shows an alternate hinge band orientation where the front and rear hinge strips only extend in one direction and either wrap around the frame adapter or the door adapter.

In the embodiment shown in FIGS. 4A-4B, the left door adapter 28 includes a flat surface 44 opposite the curved outer surface 34. In a preferred embodiment, the front and rear hinge strips 38 and 40 are secured to this surface. As a result, the front and rear hinge strip paths start from the flat surface 44. The left frame adapter 26 also preferably includes a flat surface 46 that can be a part of the hinge strip path. In a preferred embodiment, flat surfaces 44 and 46 are generally parallel to a line tangent to the associated apex 32 and 36 of the curved inner or outer surface 30 and 34. In a preferred embodiment, the front and rear hinge strips 38 and 40 are adhered to the frame adapter 26 and door adapter 28 (or frame and door panel) along surfaces other than the curved inner and outer surfaces 30 and 34 (e.g., flat surfaces 44 and 46 and/or the front and rear surfaces of the door panel or frame). In other words, in this embodiment, the front and rear hinge strips are not secured to the curved inner and outer surfaces 30 and 34. This allows the strips in the areas adjacent to the curved inner and outer surfaces to move or stretch during opening and closing. In another embodiment, the front and rear hinge strips are secured to the curved inner and outer surfaces 30 and 34.

Figure 5A:
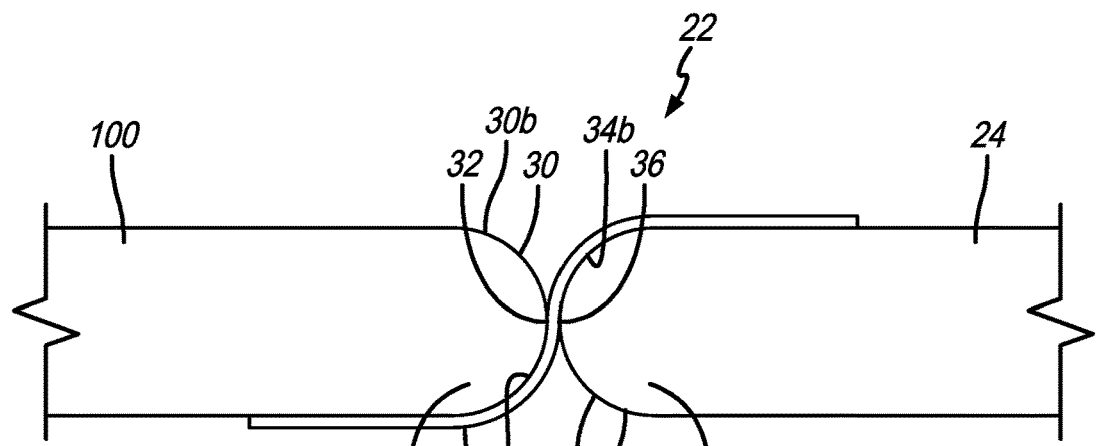
FIG. 5A is a top plan view of another embodiment of a hinge assembly.

It will be appreciated that, generally, the left door adapter 28 is associated with the left door panel 24. This is a broad way of saying the left door adapter 28 can be a separate piece that is attached to the left door panel 24 (FIG. 4A) or the left door adapter 28 is monolithically formed with or a part of left door panel 24 (FIG. 5A). Specifically, in FIGS. 4A-4B, the left door panel 24 includes an inner surface 24a to which the left door adapter 28 is attached. It will also be appreciated that, generally, the left frame adapter 26 is associated with the frame 100 on the left side of the wall where the door assembly 10 is mounted. This is a broad way of saying the left frame adapter 26 can be a separate piece that is attached to the frame 100 (FIG. 4A) or the left door adapter 28 is monolithically formed with or a part of the frame 100 (FIG. 5A). Specifically, in FIGS. 4A-4B, the frame 100 includes an inner surface 100a to which the left frame adapter 26 is attached.

The left door adapter 28 can be secured to the left door panel 24 via threaded fasteners, rivets, adhesive, glue, etc. Furthermore, the left door adapter 28 can be secured directly to the portions of the front and rear hinge strips 38 and 40 that are interposed between the left door adapter 28 and the left door panel 24. The left frame adapter 26 can be secured to the frame 100 via threaded fasteners, rivets, adhesive, glue, etc. Furthermore, the left frame adapter 26 can be secured directly to the portions of the front and rear hinge strips 38 and 40 that are interposed between the left frame adapter 26 and the frame. FIG. 3 shows openings 48 in the various adapters for securing the adapters to the frame or the door panels.

It will be appreciated that the left and right door panels 24 and 20 are both movable between a front open position, a closed position and a rear open position and the inner surface of the left door panel opposes the inner surface of the right door panel when they are each in the closed position. The front and rear hinge strips 38 and 40 bias the left and right door panels to the closed position.

Figure 5B:
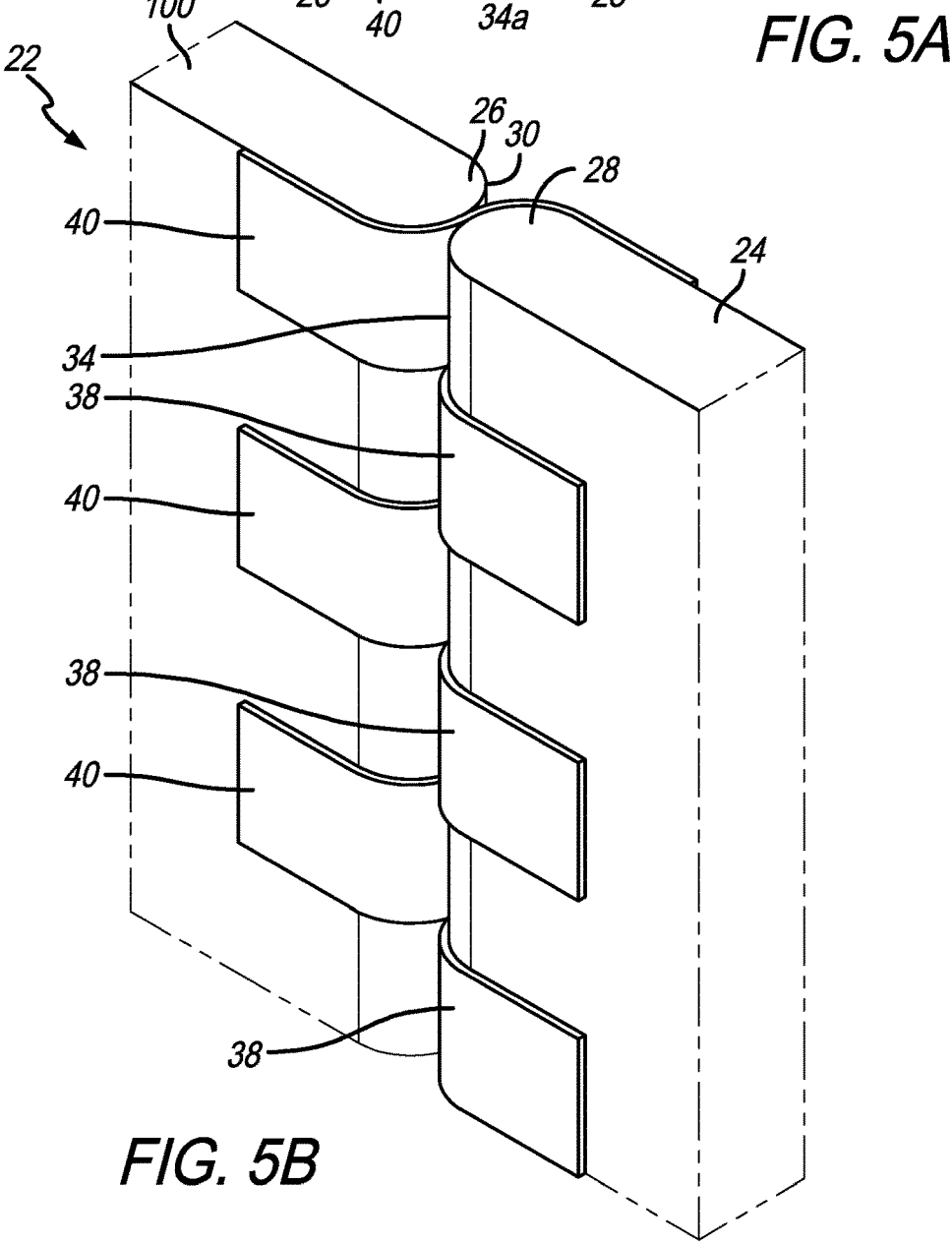
FIG. 5B is a perspective view of the hinge assembly shown in FIG. 5A.

FIGS. 5A-5B show an embodiment where the front and rear hinge strips 38 and 40 do not extend to a flat surface on the back of the left frame adapter 26 or left door adapter 28. This can be used in an embodiment where the left frame adapter 26 and left door adapter 28 are monolithically formed with the frame 100 and left door panel 24, respectively (i.e., where the inner and outer curved surfaces are formed on the frame and the left door panel).

Figure 6A:
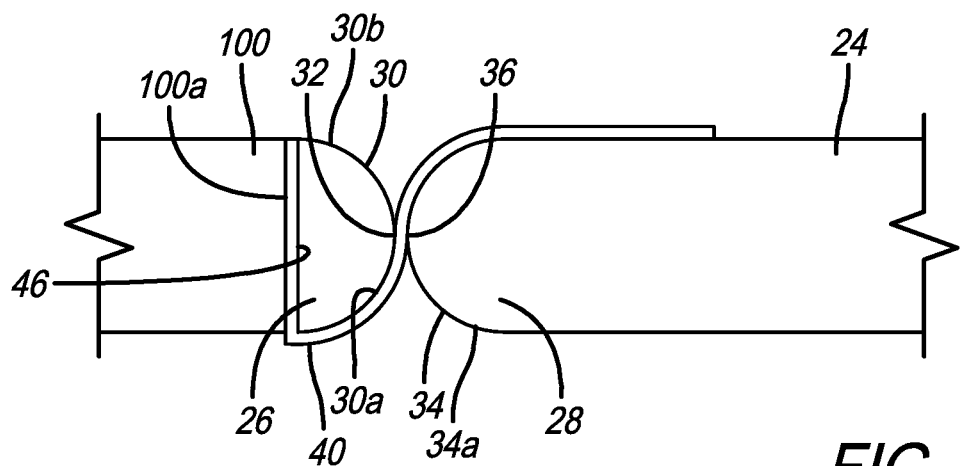
FIG. 6A is a top plan view of another embodiment of a hinge assembly.
Figure 6B:
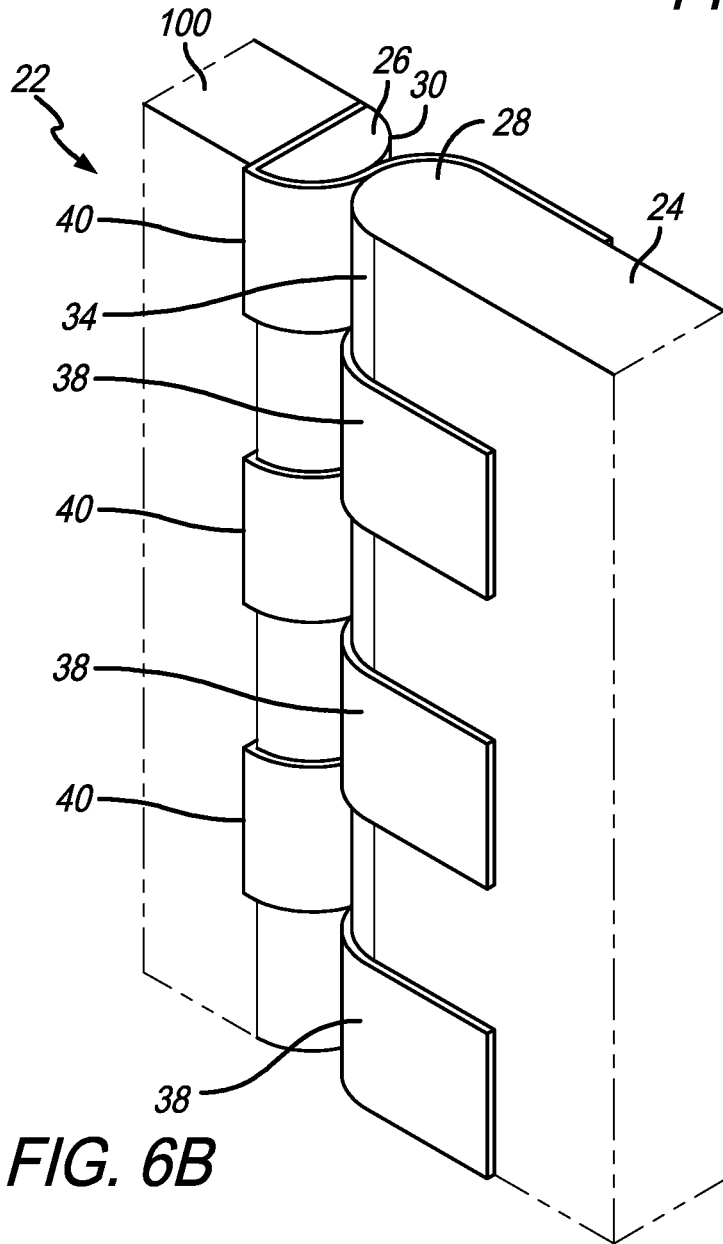
FIG. 6B is a perspective view of the hinge assembly shown in FIG. 6A.

FIGS. 6A and 6B show an embodiment where the front and rear hinge strips 38 and 40 are a hybrid of the embodiments shown in FIGS. 4A-5B. This can be used, for example, where the curved outer surface 34 is formed directly on the left door panel 24 and the left frame adapter 26 is used to attach to the frame 100.

As shown in FIGS. 2 and 3, in a preferred embodiment, the right door panel 20 includes a first magnet member 50 disposed adjacent a top edge thereof and the header 104 of the frame 100 includes a second magnet member 52 disposed adjacent a bottom edge thereof. Furthermore, the left door panel 24 includes a first magnet member 50 disposed adjacent a top edge thereof and the header 104 of the frame includes a second magnet member 52 disposed adjacent a bottom edge thereof. These magnet members 50 are used to help move or pull the left and right door panels 20 and 24 to the closed position. The door assemblies can also include opposing magnet members 50 and 52 in the door adapter 28 and the frame adapter 26 (see FIG. 3). These magnets also help pull the left and right door panels and/or the left and right hinge assemblies back to the closed position.

FIGS. 7-13 show a preferred embodiment of the lock assembly 60 for locking the left and right door panels 24 and 20 in the closed position. As shown in FIGS. 7-10, generally, the lock assembly 60 includes a vertical linkage or vertical bar 62, a blocking member 64, and one or more linkage assemblies 66 that connect the vertical bar 62 to the blocking member 64. Preferably, the vertical bar 62 includes handles 68 extending outwardly therefrom.

As shown in FIGS. 2-3, the lock assembly 60 is positioned in the left and right door panels 24 and 20. In a preferred embodiment, the lock assembly 60 also includes a receiver member 70 that includes a pocket 72 defined therein. In use, the blocking member 64 is received in the pocket 72 to lock the door assembly 10 or to prevent the door panels from being opened. The receiver member 70 can simply be a pocket 72 cut or carved into the door panel or can be an insert (see FIGS. 11-13) that includes the pocket 72 defined therein and that is secured in the door panel. In the embodiment shown in FIGS. 2-3, the blocking member 64 and associated components are secured in the right door panel 20 and the receiver member 70 is associated with the left door panel 24. For example, the blocking member 64 and associated components can be positioned in or housed in a space in the right door panel 20 the is defined between the front and rear surfaces. However, this arrangement can be reversed.

Figure 7:
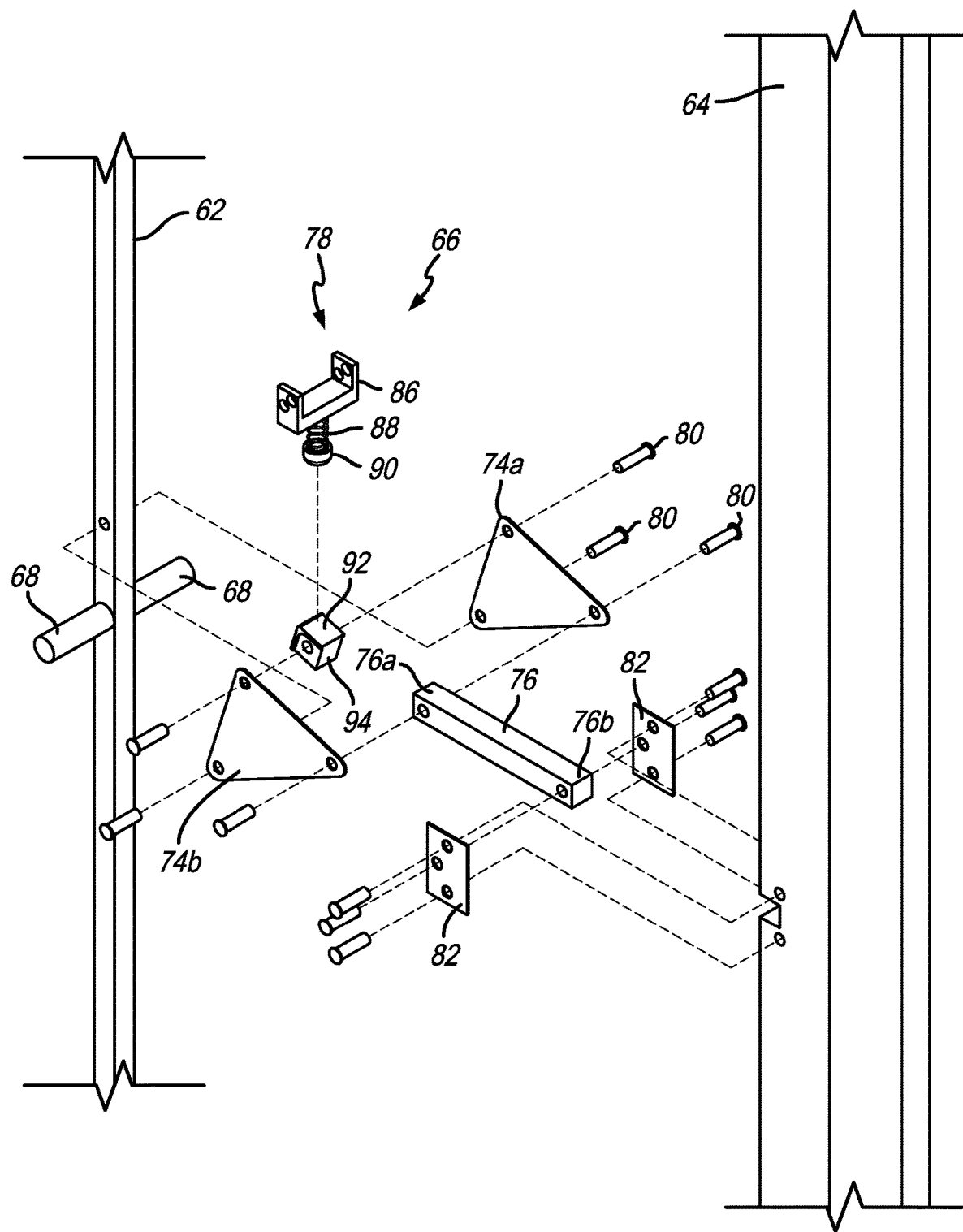
FIG. 7 is an exploded view of a lock assembly in accordance with a preferred embodiment of the present invention.

In a preferred embodiment, each linkage assembly 66 includes inner and outer triangle members 74a and 74b that form a triangle member assembly 74, a bar member 76 and a detent assembly 78. In another embodiment, one of the inner or outer triangle members can be omitted and only a single triangle member can be used in the linkage assembly 66. This arrangement is still referred to herein as a triangle member assembly 74. The triangle member assembly 74 and bar member 76 cooperate to form a four bar linkage. As shown in FIG. 7, various components of the linkage assembly 66 can be secured together using threaded fasteners 80, brackets 82 and the like. Other mechanical fasteners, such as rivets, welding, glue, etc. can also be used.

Figure 8:
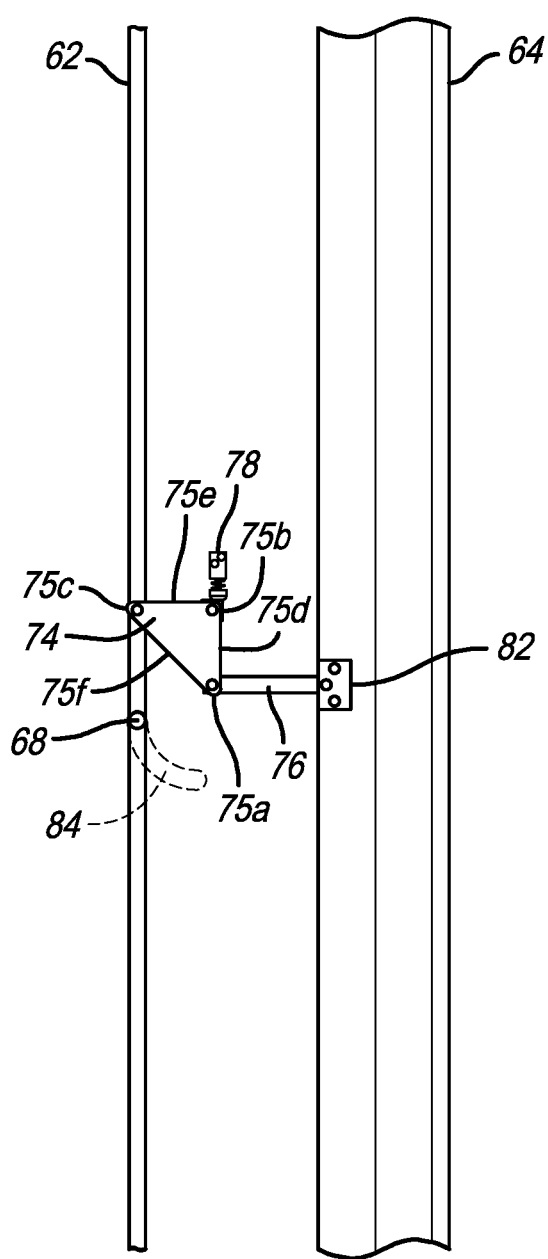
FIG. 8 is a side elevational view of the lock assembly with the blocking member in the first position and the handle in the start position.

As shown in FIG. 8, the triangle member assembly 74 (of each linkage assembly 66) includes first, second and third corners 75a, 75b and 75c. The first corner 75a is pivotably or rotatably attached to a first end 76a of the bar member 76 and the third corner 75c is pivotably or rotatably attached to the vertical bar 62. The second end 76b of the bar member 76 is pivotably or rotatably attached to the blocking member 64. As shown in FIG. 8, the triangle member assembly 74 also includes first, second and third legs 75d, 75e and 75f. In a preferred embodiment, the first and second legs 75d and 75e are the same length, and the third leg 75f is longer than the first and second legs 75d and 75e. In another embodiment, the first and second legs can be different lengths. In another embodiment, the third length can be shorter than one or more of the first and second legs.

As shown in FIGS. 2 and 8, the handle 68 extends outwardly through a curved slot 84 that is defined in the right door panel 20 (or left door panel if the arrangement is reversed). The curved slot 84 allows the handle 68 to be moved along a curved path. Because the handle 68 extends outwardly from the vertical bar 62, movement of the handle 68 along the curved path causes the vertical bar 62 to move along a similar curved path having the same curvature or shape. Furthermore, because the third corners 75c of the triangle member assemblies 74 are pivotably attached to the vertical bar 62, movement of the vertical bar 62 along the curved path causes movement of the third corners 75c of the triangle member assemblies 74 along a similar curved path having the same curvature or shape. As a result of this movement, the blocking member 64 moves horizontally (to the right in FIGS. 8-10) and away from the vertical bar 62 and handle 68.

Figure 9:
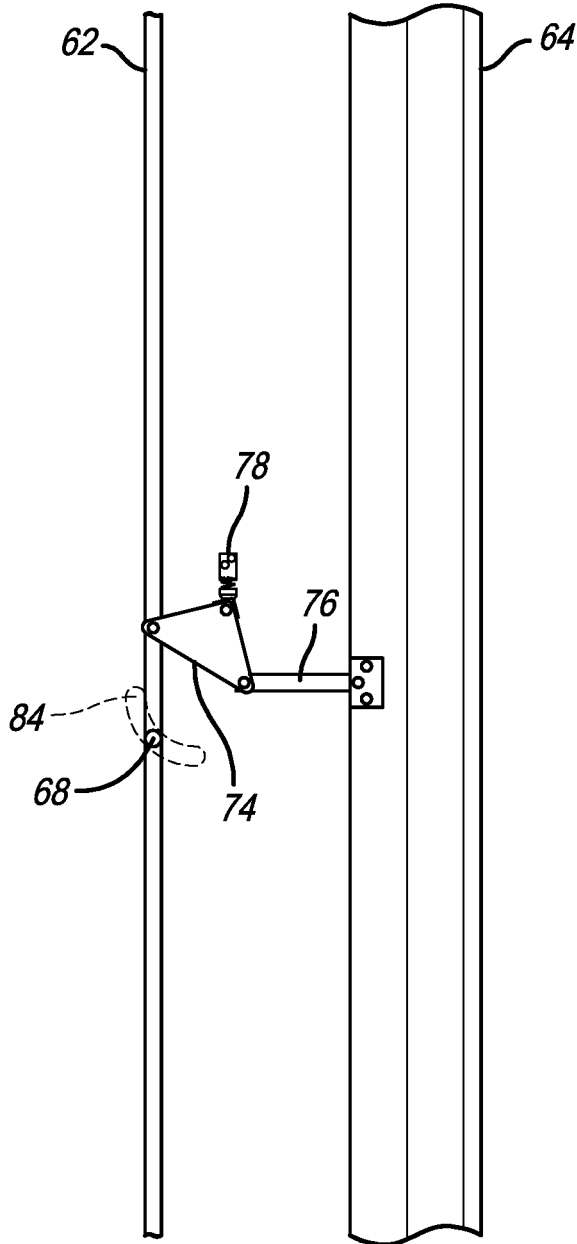
FIG. 9 is a side elevational view of the lock assembly with the blocking member partially moved toward the second position.
Figure 10:
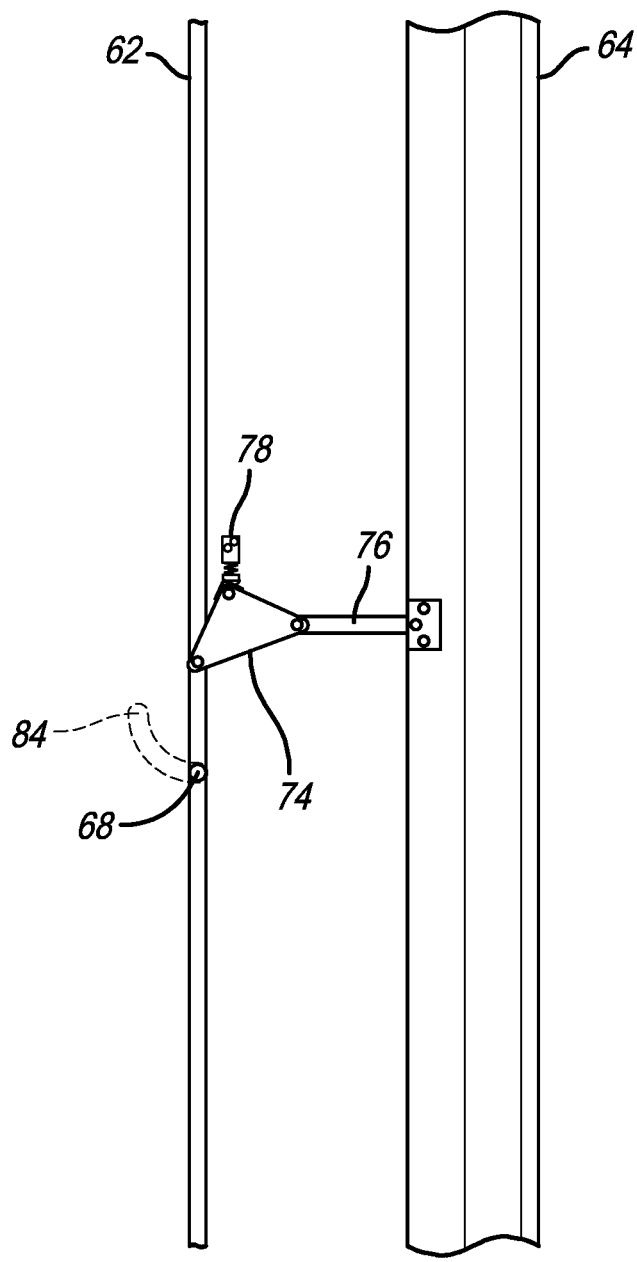
FIG. 10 is a side elevational view of the lock assembly with the blocking member in the second position and the handle in the finish position.

With reference to FIGS. 8-10, the movement of the blocking member 64 is shown. FIG. 8 shows the blocking member 64 in the first position and the handle 68 in the starting position (where the doors can be opened), FIG. 9 shows the blocking member 64 after the handle 68 has been partially moved along the curved path, and FIG. 10 shows the blocking member 64 in the second position and the handle 68 in the finish position (where the doors cannot be opened). During movement of the handle 68 along the curved path, as a result of the movement of the third corner 75c, the triangle member assembly 74 pivots about the second corner 75b and the first corner 75a moves upwardly and to the right, which also moves the first end 76a of the bar member 76. As a result of the length of the third leg 75f of the triangle member assembly 74, and the connection of the second end 76b of the bar member 76 to the blocking member 64, the blocking member 64 moves outwardly and to the right (as well as upwardly). In use, this movement causes the blocking member 64 to be received in the pocket 72. See FIGS. 11-13, which show the blocking member 64 moving into the pocket 72. Therefore, a first distance is defined between the handle 68/vertical bar 62 and the blocking member 64 when the blocking member is in the first position and a second distance is defined between the handle 68/vertical bar 62 and the blocking member 64 when the blocking member 64 is in the second position and received in the pocket. It will be appreciated that the second distance is greater than the first distance. It will also be appreciated that as a result of both the vertical bar and handle having a horizontal component of movement during movement of the blocking member (when locking the doors), the distance the blocking member 64 moves relative to the insert member 70 is greater than the movement of the blocking member 64 relative to the vertical bar 62 (the second distance).

It will be appreciated that a simpler version of the lock assembling 60 includes only a single linkage assembly 66 with a single triangle member assembly 74. In this embodiment, the vertical bar 62 can be omitted and the handle 68 can extend from the third corner 75c of the triangle member assembly 74. As long as the handle 68 is associated with the third corner 75c either directly (i.e., located on the corner) or indirectly (i.e., located on the vertical bar 62 that is attached to the third corner) such that it can move the third corner 75c along the curved path, the assembly will work properly. In a preferred embodiment, the first leg 75d is generally vertically oriented in the first or start position and the second leg 75e is generally horizontally oriented in the first or start position.

The detent assembly 78 is provided to hold the blocking member 64 in the first or second position. In a preferred embodiment, the detent assembly 78 includes a bracket 86, a spring 88 and a cap 90. The bracket 86 is mounted or otherwise secured to the door panel and within a space or opening within the door panel. The spring 88 extends downwardly from the bracket so that the cap 90 engages with and is pressed against the second corner 75b of the triangle member assembly 74. In the start position (shown in FIG. 8), the cap 90 presses against the second leg 75e of the triangle member assembly 74 and in the finish position (shown in FIG. 10) the cap 90 presses against the first leg 75d. In a preferred embodiment, the triangle member assembly 74 second corner 75b includes a detent surface 92 that extends between the first leg 75d and the second leg 75e and over the second corner 75b. As the triangle member assembly 74 pivots from the start position to the finish position, the cap 90 rides or slides on the detent surface 92. As shown in FIG. 7, in a preferred embodiment, the detent surface 92 is defined on an insert 94 that is sandwiched between the inner and outer triangle members 74a and 74b. In another embodiment, the insert 94 can be secured to a single triangle member.

Figure 11:
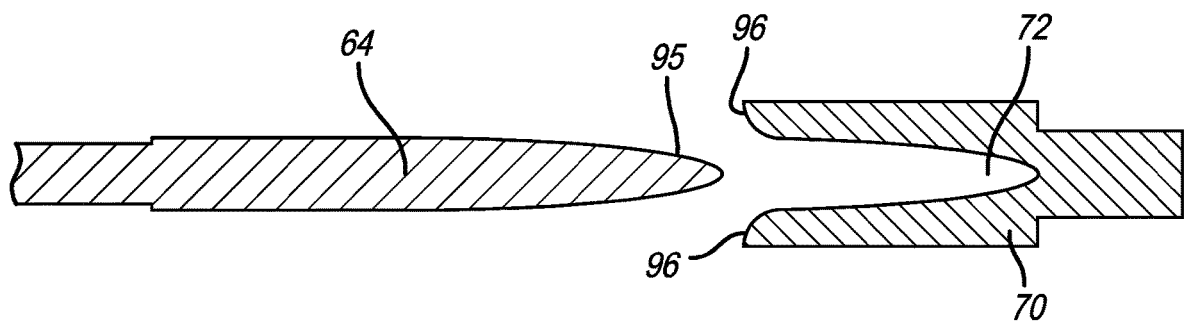
FIG. 11 is a cross-sectional top elevational view showing the blocking member in the first position.
Figure 12:
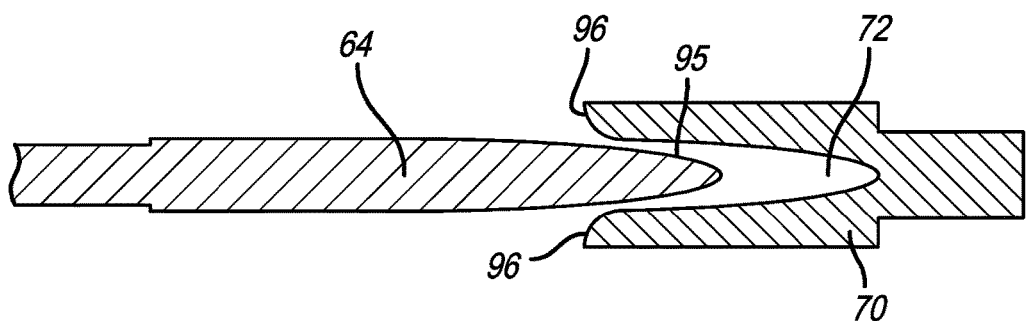
FIG. 12 is a cross-sectional top elevational view showing the blocking member moving into the pocket.
Figure 13:
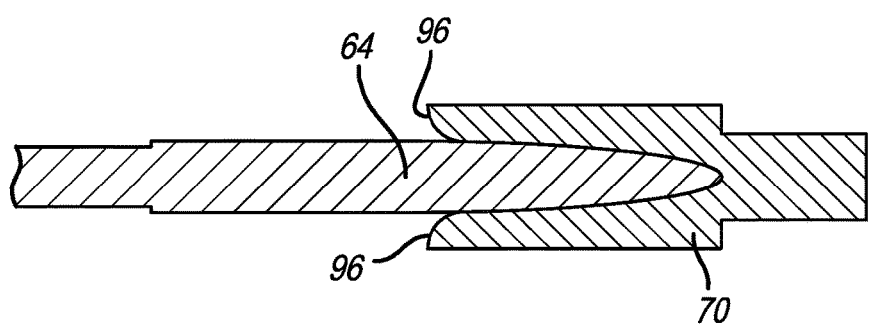
FIG. 13 is a cross-sectional top elevational view showing the blocking member in the second position.

FIGS. 11-13 show cross-sectional plan views of the blocking member 64, receiver member 70 and pocket 72 as the blocking member moves between the first position and second position. It will be appreciated that the blocking member 64 can be any shape that allows it to fit within the pocket and prevent the doors from being opened. In a preferred embodiment, the profile or shape of the leading or distal surface 95 of the blocking member 64 is a portion of an ellipse or defines an elliptical cross-section (when viewed from above) to assist with indexing the left and right door panels 24 and 20 in the center position and limit the friction forces of the inserting of the blocking member 64 into the receiver member 70 and pocket 72. The ellipse has a major axis extending parallel to the direction of movement of the blocking member 64 and a minor axis extending laterally thereto. In such an embodiment, preferably the pocket 72 includes the same elliptical shape for receiving the blocking member 64. Preferably, the receiver member 70 includes inclined or curved edges 96 at the leading edge thereof that helps guide the blocking member 64 into the pocket 72.

As shown in FIGS. 1-3, in a preferred embodiment, the right and left door panels 20 and 24 include handles 110 thereon for opening and closing the door panels. Preferably, the handle 110 includes rounded edges and generally has a U-shape. When positioned on a door panel, the main body portion 112 of the handle 110 defines a pocket 114 with the door panel and defines an opening 116 that faces horizontally outwardly. In use, the user puts their hand through the opening 116, into the pocket 114 and pulls or pushes to open the doors.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A hinge assembly comprising:
   a frame adapter that includes a curved inner surface that defines a first apex, wherein the curved inner surface includes a front portion and a rear portion, wherein the frame adapter includes a magnet member disposed adjacent the first apex,
   a door adapter that includes a curved outer surface that defines a second apex, wherein the curved outer surface includes a front portion and a rear portion, wherein the curved outer surface of the door adapter opposes the curved inner surface of the frame adapter, and wherein the door adapter includes a magnet member disposed adjacent the second apex that opposes the magnet member of the frame adapter,
   at least one front hinge strip that is secured along at least a portion of at least a portion of a front hinge strip path, wherein the front hinge strip path extends from the front portion of the curved outer surface of the door adapter to the rear portion of the curved inner surface of the frame adapter, and
   at least one rear hinge strip that is secured along at least a portion of a rear hinge strip path, wherein the rear hinge strip path extends from the rear portion of the curved outer surface of the door adapter to the front portion of the curved inner surface of the frame adapter,
   wherein the door adapter is movable relative to the frame adapter between a front open position, a closed position and a rear open position.

2. The hinge assembly of claim 1 further comprising a plurality of alternating front and rear hinge strips.

3. The hinge assembly of claim 2 wherein the plurality of alternating front hinge strips and rear hinge strips are attached to form a hinge band.

4. The hinge assembly of claim 1 wherein the front hinge strip and the rear hinge strip bias the door adapter to the closed position.

5. The hinge assembly of claim 1 wherein the door adapter includes a flat surface, wherein the front hinge strip path extends from the flat surface to the front portion of the curved outer surface of the door adapter to the rear portion of the curved inner surface, wherein the rear hinge strip path extends from the flat surface to the rear portion of the curved outer surface of the door adapter to the front portion of the curved inner surface of the right frame adapter.

6. The hinge assembly of claim 5 wherein the frame adapter includes a flat surface, wherein the front hinge strip path extends from the flat surface of the door adapter to the front portion of the curved outer surface of the door adapter to the rear portion of the curved inner surface of the frame adapter and to the flat surface of the frame adapter, wherein the rear hinge strip path extends from the flat surface of the door adapter to the rear portion of the curved outer surface of the door adapter to the front portion of the curved inner surface of the frame adapter and to the flat surface.

7. The hinge assembly of claim 5 further comprising a door panel attached to the flat surface of the door adapter.

8. The hinge assembly of claim 7 wherein at least a portion of the front and rear hinge strips is positioned between the door panel and the door adapter.

9. The hinge assembly of claim 1 wherein the frame adapter includes a flat surface, wherein the front hinge strip path extends from the front portion of the curved outer surface of the door adapter to the rear portion of the curved inner surface of the frame adapter and to the flat surface, wherein the rear hinge strip path extends from the rear portion of the curved outer surface of the door adapter to the front portion of the curved inner surface of the frame adapter and to the flat surface.

10. The hinge assembly of claim 9 wherein the door adapter includes a flat surface, wherein the front hinge strip path extends from the flat surface of the door adapter to the front portion of the curved outer surface of the door adapter to the rear portion of the curved inner surface of the frame adapter and to the flat surface of the frame adapter, wherein the rear hinge strip path extends from the flat surface of the door adapter to the rear portion of the curved outer surface of the door adapter to the front portion of the curved inner surface of the frame adapter and to the flat surface of the frame adapter.

11. The hinge assembly of claim 10 wherein the flat surface of the door adapter is generally parallel to a line tangent to the second apex, and wherein the flat surface of the frame adapter is generally parallel to a line tangent to the first apex.

12. The hinge assembly of claim 1 wherein the front hinge strip is not secured to the curved outer surface, and wherein the rear hinge strip is not secured to the curved inner surface.

13. A hinge assembly comprising:
- a frame adapter that includes a curved inner surface that defines a first apex, wherein the curved inner surface includes a front portion and a rear portion, wherein the frame adapter includes a flat surface that is generally parallel to a line tangent to the first apex, wherein the frame adapter includes a magnet member disposed adjacent the first apex,
- a door adapter that includes a curved outer surface that defines a second apex, wherein the curved outer surface includes a front portion and a rear portion, wherein the door adapter includes a flat surface that is generally parallel to a line tangent to the second apex, wherein the curved outer surface of the door adapter opposes the curved inner surface of the frame adapter, and wherein the door adapter includes a magnet member disposed adjacent the second apex that opposes the magnet member of the frame adapter,
- a plurality of alternating front hinge strips and rear hinge strips, wherein the front hinge strips extend along a front hinge strip path, wherein the front hinge strip path extends from the flat surface of the door adapter to the front portion of the curved outer surface of the door adapter to the rear portion of the curved inner surface of the frame adapter and to the flat surface of the frame adapter, wherein the rear hinge strip path extends from the flat surface of the door adapter to the rear portion of the curved outer surface of the door adapter to the front portion of the curved inner surface of the frame adapter and to the flat surface of the frame adapter,
- wherein the door adapter is movable relative to the frame adapter between a front open position, a closed position and a rear open position, and wherein the front hinge strips and the rear hinge strips bias the door adapter to the closed position.

14. The hinge assembly of claim 13 wherein the plurality of alternating front hinge strips and rear hinge strips are attached to form a hinge band.

15. The hinge assembly of claim 14 wherein the alternating front hinge strips and rear hinge strips are attached along an apex portion to form the hinge band.

16. A hinge assembly comprising:
- a frame adapter that includes a curved inner surface that defines a first apex, wherein the curved inner surface includes a front portion and a rear portion,
- a door adapter that includes a curved outer surface that defines a second apex, wherein the curved outer surface includes a front portion and a rear portion, wherein the curved outer surface of the door adapter opposes the curved inner surface of the frame adapter,
- a first front hinge strip that is secured along at least a portion of a first front hinge strip path, wherein the first front hinge strip path extends from the front portion of the curved outer surface of the door adapter to the rear portion of the curved inner surface of the frame adapter,
- a rear hinge strip that is secured along at least a portion of a rear hinge strip path, wherein the rear hinge strip path extends from the rear portion of the curved outer surface of the door adapter to the front portion of the curved inner surface of the frame adapter,
- a second front hinge strip that is secured along at least a portion of a second front hinge strip path, wherein the second front hinge strip path extends from the front portion of the curved outer surface of the door adapter to the rear portion of the curved inner surface of the frame adapter, wherein the first rear hinge strip is positioned between the first and second front hinge strips,
- wherein the first and second front hinge strips and the rear hinge strip are attached along an apex portion to form the hinge band,
- wherein the door adapter is movable relative to the frame adapter between a front open position, a closed position and a rear open position, and wherein the apex portion is positioned between the first and second apexes when the door adapter is in the closed position.

17. The hinge assembly of claim 16 wherein the first and second front hinge paths and the rear hinge path are all straight.

* * * * *